United States Patent
Nojima et al.

(10) Patent No.: US 9,452,795 B2
(45) Date of Patent: Sep. 27, 2016

(54) VEHICLE BODY SUBSTRUCTURE OF VEHICLE

(71) Applicant: MITSUBISHI JIDOSHA KOGYO KABUSHIKI KAISHA, Tokyo (JP)

(72) Inventors: Takaya Nojima, Tokyo (JP);
Toshitsugu Misaki, Tokyo (JP);
Kosuke Yoshimura, Tokyo (JP);
Takuya Noborizato, Tokyo (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 14/378,411

(22) PCT Filed: Feb. 12, 2013

(86) PCT No.: PCT/JP2013/053265
§ 371 (c)(1),
(2) Date: Aug. 13, 2014

(87) PCT Pub. No.: WO2013/122050
PCT Pub. Date: Aug. 22, 2013

(65) Prior Publication Data
US 2015/0015026 A1    Jan. 15, 2015

(30) Foreign Application Priority Data
Feb. 14, 2012 (JP) ................. 2012-029997

(51) Int. Cl.
*B62D 35/00* (2006.01)
*B62D 35/02* (2006.01)
*B62D 25/20* (2006.01)

(52) U.S. Cl.
CPC .............. *B62D 35/02* (2013.01); *B62D 25/20* (2013.01)

(58) Field of Classification Search
CPC .............................. B62D 35/02; B62D 35/00
USPC ........................................... 296/180.1, 180.4
See application file for complete search history.

(56) References Cited

U.S. PATENT DOCUMENTS

| 4,772,060 A * | 9/1988 | Kretschmer ............... 296/180.1 |
| 5,322,340 A * | 6/1994 | Sato et al. ................. 296/180.1 |
| 6,575,522 B2 * | 6/2003 | Borghi et al. ............. 296/180.5 |

FOREIGN PATENT DOCUMENTS

| CN | 1740022 A | 3/2006 |
| EP | 1870322 A1 | 12/2007 |
| JP | 09-109937 A | 4/1997 |
| JP | 2002-120769 A | 4/2002 |
| JP | 2008-265677 A | 11/2008 |
| JP | 2009-029334 A | 2/2009 |

* cited by examiner

*Primary Examiner* — Joseph D Pape
(74) *Attorney, Agent, or Firm* — Birch, Stewart, Kolasch & Birch, LLP

(57) ABSTRACT

Outer side end sections 16a of a floor undercover 16 in a width direction of a vehicle are provided so as to overlap, in a front-rear direction of the vehicle, with rear wheels 19 forwardly of the rear wheels 19b in the front-rear direction of the vehicle. Front parts of the side end sections 16a in the front-rear direction of the vehicle are composed of concavities 20 concave upward in a vertical direction of the vehicle relative to other parts of the floor undercover 16. Fronts of the concavities 20 in the front-rear direction of the vehicle are open, while rear end surfaces 22 of the concavities 20 in the front-rear direction of the vehicle are inclined obliquely downwardly toward the rear of the vehicle.

12 Claims, 5 Drawing Sheets

FRONT ⟵⟶ REAR

FRONT ⟵⟶ REAR

VEHICLE BODY SUBSTRUCTURE OF VEHICLE

TECHNICAL FIELD

This invention relates to a vehicle body substructure in a lower part of a vehicle. More particularly, the invention relates to the structure of an undercover provided to cover the undersurface of a vehicle body.

BACKGROUND ART

Among vehicle body substructures of vehicles such as automobiles has conventionally been that in which an undercover for covering the underside of a floor is mounted in a lower part of the vehicle. By mounting the undercover, the undersurface of the vehicle body is flattened to enhance the aerodynamic characteristics of the vehicle during its travel and improve the high speed stability and fuel economy of the vehicle.

In recent years, moreover, a proposal has been made for a structure in which a travel wind flowing rearward below the undersurface of the vehicle body is straightened by the shape of the undercover to improve the aerodynamic characteristics of the vehicle body. A concrete example is a structure in which a straightening protruding portion protruding downward from the surface of the undercover is provided ahead of a rear wheel suspension (see Patent Document 1).

Configurations as described above exhibit the action and effect of decreasing collisions between a suspension element and the travel wind flowing below the undersurface of the vehicle body, thereby reducing turbulence, by the rear wheel suspension, in the travel wind flowing in the center of a space in the width direction of the vehicle below the undersurface of the vehicle body.

PRIOR ART DOCUMENTS

Patent Documents

Patent Document 1: JP-A-2008-265677

SUMMARY OF THE INVENTION

Problems to be Solved by the Invention

It is also known that a travel wind flowing below the undersurface of the vehicle body collides with the rear wheels which are running (rotating), and thus becomes turbulent, thereby greatly affecting the aerodynamic characteristics of the vehicle. Collisions between the travel wind and the rear wheels are basically unavoidable. The present inventors, however, eagerly conducted studies, and found that the aerodynamic characteristics could be improved by allowing the travel wind to be guided downward in a state as straight as possible relative to the rear wheels.

Providing a straightening protruding portion, as in Patent Document 1, ahead of the rear wheels can be expected to improve the aerodynamic characteristics.

The straightening protruding portion provided to protrude downward from the surface of the undercover as in Patent Document 1, however, may cause resistance, more or less, to the travel wind, and has the possibility of adversely affecting the aerodynamic performance of the vehicle.

Furthermore, the height of the undercover surface (its distance from the road surface) and the size (shape) of the straightening protruding portion show their highest effects in manners different according to the vehicle model or the like. Since the straightening protruding portion protrudes downward, it is susceptible to influences from limitations on the minimum road clearance. A layout including the size of the straightening protruding portion or the height of the undercover may also be subject to limitations. Thus, there is a possibility that the straightening effect of the undercover cannot be fully exhibited.

The invention according to Patent Document 1 aims essentially at suppressing collisions of the travel wind with the suspension mechanism, and makes no mention of turbulence due to the collisions of the travel wind with the rear wheels.

The present invention has been accomplished in the light of the circumstances described above. It is an object of the present invention to provide a vehicle body substructure of a vehicle, which is configured to undergo minimal influence by limitations on the minimum road clearance, which can suppress turbulence in a travel wind due to collisions with the wheels, and which can improve aerodynamic characteristics.

Means for Solving the Problems

A first aspect of the present invention for solving the above-mentioned problems is a vehicle body substructure of a vehicle, which has an undercover for covering an underside of a floor of the vehicle, wherein outer side end sections of the undercover in a width direction of the vehicle are provided so as to overlap, in a front-rear direction of the vehicle, with wheels forwardly of the wheels in the front-rear direction of the vehicle; front parts of the side end sections of the undercover in the front-rear direction of the vehicle are composed of concavities concave upward in a vertical direction of the vehicle relative to other parts of the undercover; and fronts of the concavities in the front-rear direction of the vehicle are open, while rear end surfaces of the concavities in the front-rear direction of the vehicle are inclined obliquely downwardly toward a rear of the vehicle.

In the first aspect, collisions of the travel wind with the wheels are reduced, whereby turbulence in the travel wind is suppressed. Moreover, there is no part protruding downward from the surface of the undercover. Thus, influence from limitations on the minimum road clearance is minimal, and resistance to the travel wind is not increased.

A second aspect of the present invention is the vehicle body substructure of a vehicle according to the first aspect, wherein the rear end surfaces of the concavities in the front-rear direction of the vehicle are inclined so as to have extensions passing below the wheels.

In the second aspect, collisions of the travel wind with the wheels are reduced more reliably.

A third aspect of the present invention is the vehicle body substructure of a vehicle according to the first or second aspect, wherein the rear end surfaces of the concavities in the front-rear direction of the vehicle are provided at positions separated forwardly from the wheels by a predetermined distance.

In the third aspect, collisions of the travel wind with the wheels are reduced more reliably.

A fourth aspect of the present invention is the vehicle body substructure of a vehicle according to any one of the first to third aspects, wherein the rear end surfaces of the concavities in the front-rear direction of the vehicle are composed of curved surfaces convex outwardly.

In the four aspect, collisions of the travel wind with the wheels are reduced more reliably.

Effects of the Invention

According to the present invention, as described above, collisions of the travel wind with the wheels can be minimized to suppress turbulence in the travel wind with high efficiency, without increasing resistance to the travel wind. Thus, the aerodynamic characteristics of the vehicle can be improved.

MODE FOR CARRYING OUT THE INVENTION

An embodiment of the present invention will now be described in detail by reference to the accompanying drawings.

Figure 1:
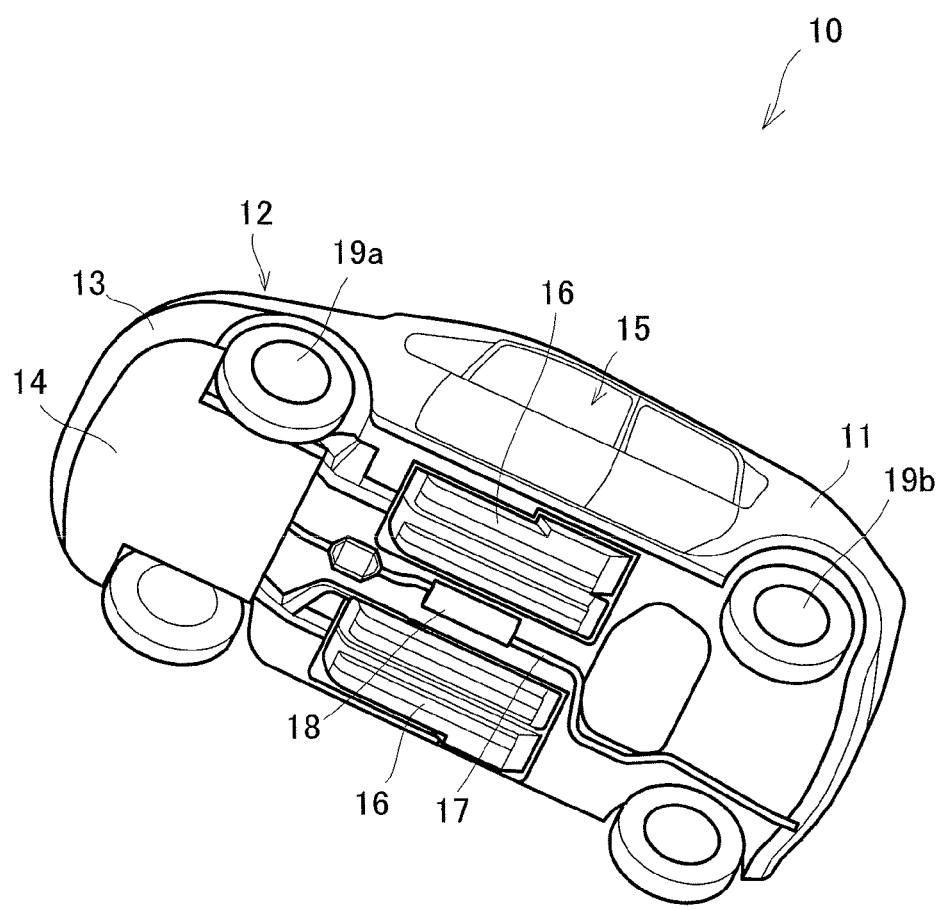
FIG. 1 is a perspective view showing the schematic configuration of a lower part of the vehicle body of a vehicle according to an embodiment of the present invention.
Figure 2:
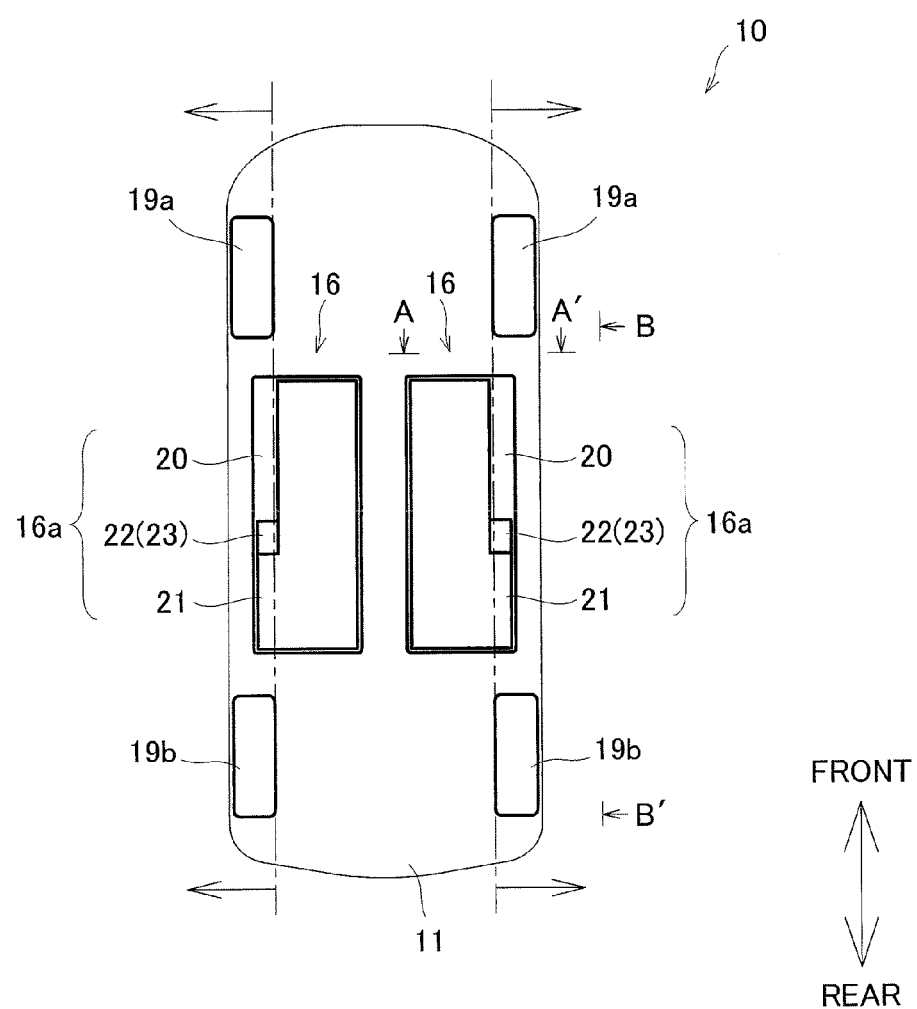
FIG. 2 is a plan view showing a floor undercover according to the embodiment of the present invention.
Figure 3:
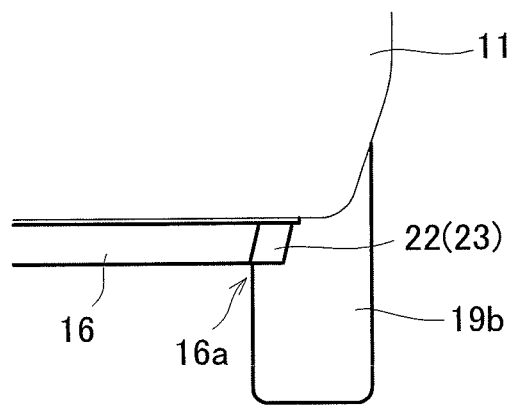
FIG. 3 is a side view showing the floor undercover according to the embodiment of the present invention.
Figure 4:
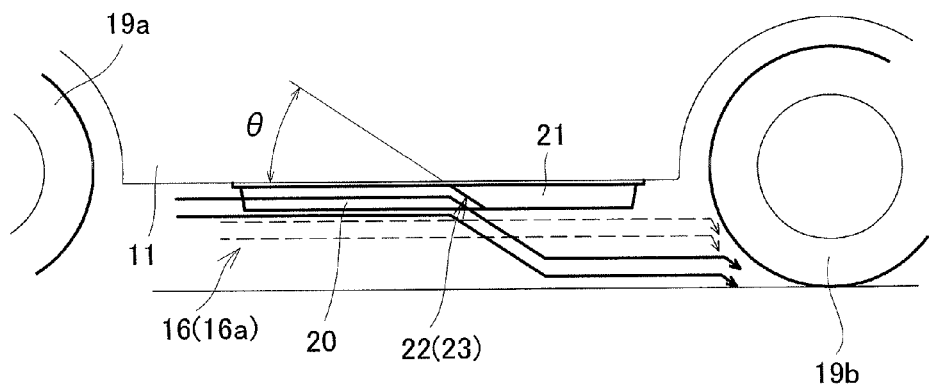
FIG. 4 is a side view showing the floor undercover according to the embodiment of the present invention.

FIG. 1 is a perspective view showing the schematic configuration of a lower part of the vehicle body of a vehicle according to an embodiment of the present invention. FIG. 2 is a plan view showing the configuration of a floor undercover. FIG. 3 is a side view showing the configuration of the floor undercover, as viewed along arrowed line A-A' in FIG. 2. FIG. 4 is a side view showing the configuration of the floor undercover, as viewed along arrowed line B-B' in FIG. 2.

As shown in FIGS. 1 to 4, a front undercover 14 for covering the lower surfaces of an engine room 12 and a front bumper 13 is provided in the front of a lower part of a vehicle body 11 of a vehicle 10 which is an automobile. A floor undercover 16 for covering the undersurface of a floor (vehicle compartment) 15 of the vehicle 10 is provided behind the front undercover 14. In the present embodiment, an exhaust pipe 17, a muffler 18, etc. extending from the engine room 12 rearward in the front-rear direction of the vehicle are installed in the center of the undersurface of the vehicle body 11 in the transverse direction of the vehicle 10. Thus, the floor undercover 16 is provided as parts mounted independently on both sides (right and left sides) of the exhaust pipe 17, etc.

The floor undercover 16 is provided to cover regions overlapping with wheels 19 (front wheels 19a and rear wheels 19b) in the front-rear direction of the vehicle (i.e., the regions outside dashed dotted lines in FIG. 2). That is, the floor undercover 16 is continuously provided as far as the regions overlapping with the wheels 19 in the front-rear direction of the vehicle such that outer side end sections 16a of the floor undercover 16 in the transverse (width) direction of the vehicle 10 cover the above regions overlapping with the wheels 19 ahead of the rear wheels 19b in the front-rear direction of the vehicle.

In the side end sections 16a of the floor undercover, front parts thereof in the front-rear direction of the vehicle constitute concavities 20 which are concave toward the vehicle body 11 (upward) relative to other parts of the floor undercover 16. The concavities 20 are open at their fronts in the front-rear direction of the vehicle and at their outer sides in the width direction of the vehicle. In other words, the front parts of the side end sections 16a of the floor undercover in the front-rear direction of the vehicle are formed like a step. As a result, the side end sections 16a of the floor undercover 16 are configured such that their rear parts in the front-rear direction of the vehicle constitute convexities 21 protruding downward relative to the concavities 20. These convexities 21 are provided without protruding from the surface of the floor undercover 16. Rear end surfaces of the concavities 20 in the front-rear direction of the vehicle, namely, end surfaces 22 serving as boundaries between the concavities 20 and the convexities 21, are inclined obliquely downwardly toward the rear of the vehicle. That is, the end surfaces 22 of the floor undercover 16 constitute slope portions 23 inclined at a predetermined angle of $\theta$ with respect to the undersurface of the vehicle body 11 rearwardly and downwardly in the vehicle.

With such a vehicle body substructure of the vehicle 10, a travel wind passing below the side end sections 16a of the floor undercover 16 heads downward smoothly along the slope portions 23 (end surfaces 22) of the floor undercover 16, and flows rearward at low positions spaced from the floor undercover 16, as indicated by solid lines in FIG. 4. Thus, collisions of the travel wind with the rear wheels 19b are markedly decreased, and turbulence in the travel wind due to its collisions with the rear wheels 19b can be suppressed. Consequently, the aerodynamic characteristics of the vehicle 10 can be improved. As indicated by dashed lines in FIG. 4, moreover, if no concavities nor slope portions are provided in the side end sections 16a of the floor undercover 16, a travel wind flows near the surface of the floor undercover 16, and thus collides with the rear wheels 19b, causing a tendency toward turbulence.

With the present invention, moreover, the concavities 20 are provided in the floor undercover 16, and the slope portions 23 inclined obliquely downwardly toward the rear of the vehicle are formed, whereby the travel wind is straightened. That is, a stream of the travel wind can be straightened in the desired direction, without the need to provide a protruding portion which protrudes downward from the surface of the floor undercover 16. Thus, it becomes possible to enhance the aerodynamic performance of the vehicle 10 more effectively, without adversely affecting resistance to the travel wind.

Furthermore, the floor undercover 16 has no excess projection. Thus, the vehicle is minimally subject to restrictions on the layout of the floor undercover 16, such as its surface height (spacing between its surface and the road surface) or its shape, which are imposed by the influence of the minimum road clearance. Consequently, the aerodynamic characteristics can be fully exhibited.

Figure 5:
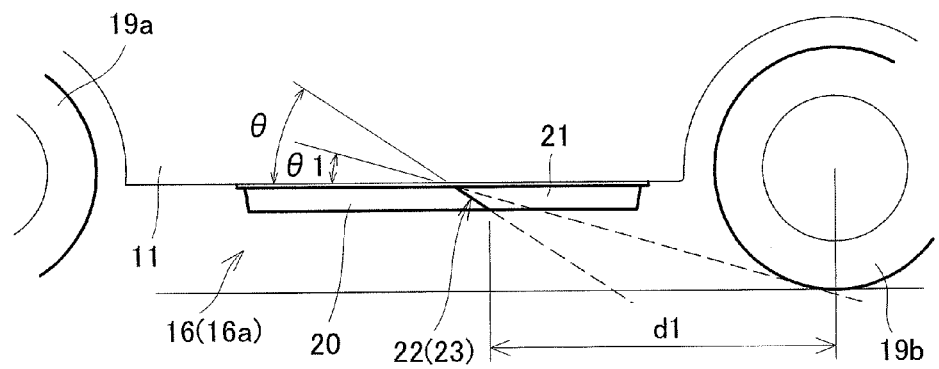
FIG. 5 is a view illustrating a slope portion according to the embodiment of the present invention.

The inclination angle $\theta$ of the slope portion 23 (end surface 22) for straightening the travel wind is not limited. If it is set at an angle close to a right angle, however, too high a resistance may arise, causing turbulence in the travel wind to exert an adverse influence. Thus, the slope portion 23 is preferably set at an angle as acute as possible. If the inclination angle $\theta$ is too small, on the other hand, there is a possibility that collisions of the travel wind with the rear wheels 19*b* cannot be fully suppressed any more. Hence, the slope portion 23 is preferably inclined at such an angle that its extension passes below the rear wheel 19*b*, as shown in FIG. 5. That is, the inclination angle θ of the slope portion 23 is preferably more than θ1, but as close to θ1 as possible.

Moreover, the slope portion 23 is preferably provided at a position spaced from the rear wheel 19*b* (e.g., the center of the rear wheel 19*b*) by a predetermined distance. That is, the position of the slope portion 23 is preferably defined in relation to the rear wheel 19*b*. In the present embodiment, for example, the distance d1 from the lower end of the end surface 22 constituting the slope portion 23 to the center of the rear wheel 19*b* is of the order of 1000 mm. By so doing, collisions of the travel wind with the rear wheel 19*b* can be suppressed more reliably.

Figure 6:
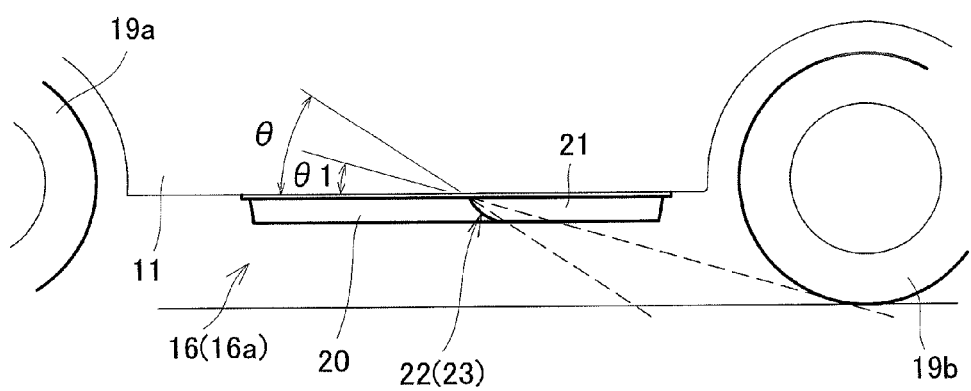
FIG. 6 is a side view showing a modification of the slope portion according to the embodiment of the present invention.

Furthermore, the end surface 22 constituting the slope portion 23 may be flat, but as shown in FIG. 6, for example, may be composed of a curved surface convex outward. Because of this configuration, a travel wind flows more smoothly along the slope portion 23. Thus, the aerodynamic characteristics of the vehicle 10 can be improved more reliably. Even when the end surface 22 constituting the slope portion 23 is a curved surface, it is preferred for the slope portion 23 to be inclined at such an angle that its extension (an extension of the line connecting the upper end and the lower end of the end surface 22) passes below the rear wheel 19*b*. That is, it is preferred that the inclination angle θ of the slope portion 23 be more than θ1.

While the embodiment of the present invention has been described above, it goes without saying that the present invention is not limited to this embodiment, but may be changed and modified, as appropriate, without departing from the spirit and scope of the invention.

EXPLANATIONS OF LETTERS OR NUMERALS

- 10 Vehicle
- 11 Vehicle body
- 12 Engine room
- 13 Front bumper
- 14 Front undercover
- 16 Floor undercover
- 16*a* Side end section
- 17 Exhaust pipe
- 18 Muffler
- 19 Wheel
- 20 Concavity
- 21 Convexity
- 22 End surface
- 23 Slope portion

The invention claimed is:

1. A vehicle body substructure of a vehicle, comprising:
   an undercover for covering an underside of a floor of the vehicle, the undercover having an outer side end section extending in a front-rear direction of the vehicle and overlapping a wheel provided behind the outer side end section when the undercover is attached to the vehicle,
   the outer side end section including,
   a forward section that defines a first flat surface extending horizontally towards a front of the vehicle when the undercover is attached to the vehicle,
   a rear section having a second flat surface extending towards a rear of the vehicle, a height of the second flat surface being lower than the first flat surface when the undercover is attached to the vehicle, and
   a rear end surface inclining obliquely downward as the rear end surface extends towards the rear of the vehicle, and extending between the first flat surface and the second flat surface, wherein
   the first flat surface is a floor panel of the vehicle.

2. The vehicle body substructure of a vehicle according to claim 1, wherein
   the rear end surface is inclined such that an imaginary line extending from the rear end surface passes below the wheels.

3. The vehicle body substructure of a vehicle according to claim 1, wherein
   the rear end surface is provided at a position forward of the wheel by a predetermined distance.

4. The vehicle body substructure of a vehicle according to claim 2, wherein
   the rear end surface is provided at a position forward of the wheel by a predetermined distance.

5. A vehicle body substructure of a vehicle, comprising:
   an undercover for covering an underside of a floor of the vehicle, the undercover having an outer side end section extending in a front-rear direction of the vehicle and overlapping a wheel provided behind the outer side end section when the undercover is attached to the vehicle,
   the outer side end section including,
   a forward section that defines a first flat surface extending horizontally towards a front of the vehicle when the undercover is attached to the vehicle,
   a rear section having a second flat surface extending towards a rear of the vehicle, a height of the second flat surface being lower than the first flat surface when the undercover is attached to the vehicle, and
   a rear end surface inclining obliquely downward as the rear end surface extends towards the rear of the vehicle, and extending between the first flat surface and the second flat surface, wherein
   the rear end surface is curved in an outward direction.

6. The vehicle body substructure of a vehicle according to claim 2, wherein
   the rear end surface is curved in an outward direction.

7. The vehicle body substructure of a vehicle according to claim 3, wherein
   the rear end surface is curved in an outward direction.

8. The vehicle body substructure of a vehicle according to claim 4, wherein
   the rear end surface is curved in an outward direction.

9. The vehicle body substructure of a vehicle according to claim 1, wherein
   the vehicle has the undercover at each side of the underside of the floor in the width direction of the vehicle.

10. The vehicle body substructure of a vehicle according to claim 5, wherein
    the rear end surface is inclined such that an imaginary line extending from the rear end surface passes below the wheels.

11. The vehicle body substructure of a vehicle according to claim 5, wherein
    the rear end surface is provided at a position forward of the wheel by a predetermined distance.

12. The vehicle body substructure of a vehicle according to claim 5, wherein
    the vehicle has the undercover at each side of the underside of the floor in the width direction of the vehicle.

* * * * *